(12) United States Patent
Gangula

(10) Patent No.: US 11,505,256 B2
(45) Date of Patent: Nov. 22, 2022

(54) VEHICLE ROOF ASSEMBLIES HAVING FLUID PASSAGES

(71) Applicant: Toyota Motor Engineering & Manufacturing North America, Inc., Plano, TX (US)

(72) Inventor: Vinay Kumar Reddy Gangula, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/177,951

(22) Filed: Feb. 17, 2021

(65) Prior Publication Data
US 2022/0258807 A1 Aug. 18, 2022

(51) Int. Cl.
*B62D 25/07* (2006.01)
*B60J 10/25* (2016.01)
*B60R 13/06* (2006.01)
*B62D 25/02* (2006.01)

(52) U.S. Cl.
CPC .............. *B62D 25/07* (2013.01); *B60J 10/25* (2016.02); *B60R 13/06* (2013.01); *B62D 25/02* (2013.01)

(58) Field of Classification Search
CPC .......... B62D 25/07; B60J 10/25; B60R 13/04; B60R 13/06; B60R 13/07

USPC .................................................. 296/213, 208
See application file for complete search history.

(56) References Cited

U.S. PATENT DOCUMENTS

| | | | |
|---|---|---|---|
| 4,518,197 A * | 5/1985 | Gallitzendorfer | B60R 13/07 296/213 |
| 6,443,519 B1 | 9/2002 | Betzl | |
| 7,029,060 B1 | 4/2006 | Osterberg et al. | |
| 2003/0010250 A1 | 1/2003 | Bunsmann et al. | |

FOREIGN PATENT DOCUMENTS

| | | |
|---|---|---|
| DE | 10336193 | 3/2005 |
| EP | 1512571 | 3/2005 |
| FR | 2727906 A1 | 6/1996 |
| KR | 20010102720 A | 11/2001 |

OTHER PUBLICATIONS

Arunphilip; "Water Leakage in Cars—Causes & Solutions"; Team-BHP.com; https://www.team-bhp.com/forum/technical-stuff/179972-waterleakage-cars-causes-solutions.html; Sep. 11, 2016; 14 pages.

* cited by examiner

*Primary Examiner* — Dennis H Pedder
(74) *Attorney, Agent, or Firm* — Dinsmore & Shohl LLP

(57) ABSTRACT

A vehicle roof assembly including a roof panel, a side panel coupled to the roof panel, thereby defining a roof ditch, a passage extending along the roof ditch, and a sealing member at least partially encasing the passage. The passage allows fluid to flow along the roof ditch.

19 Claims, 3 Drawing Sheets

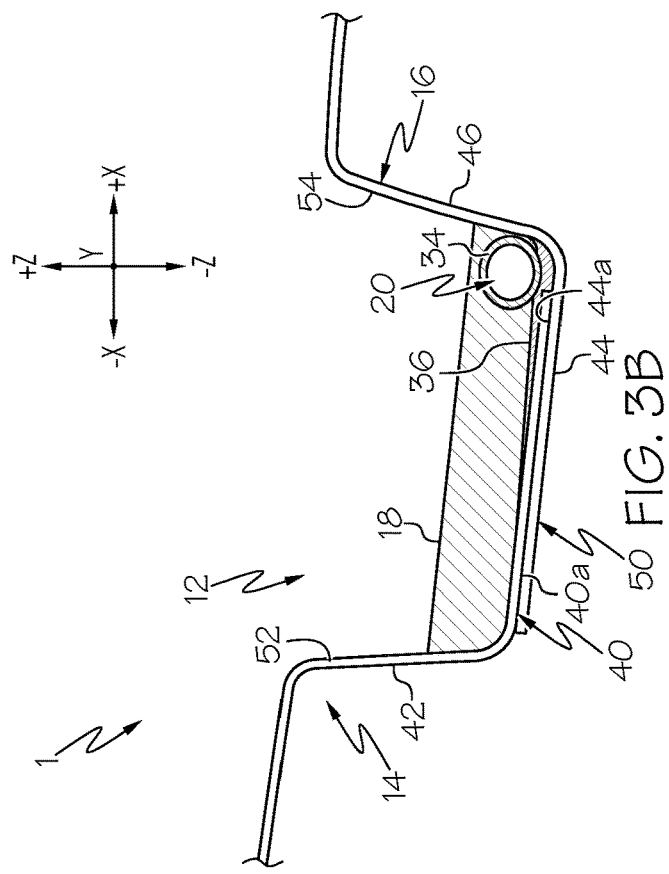
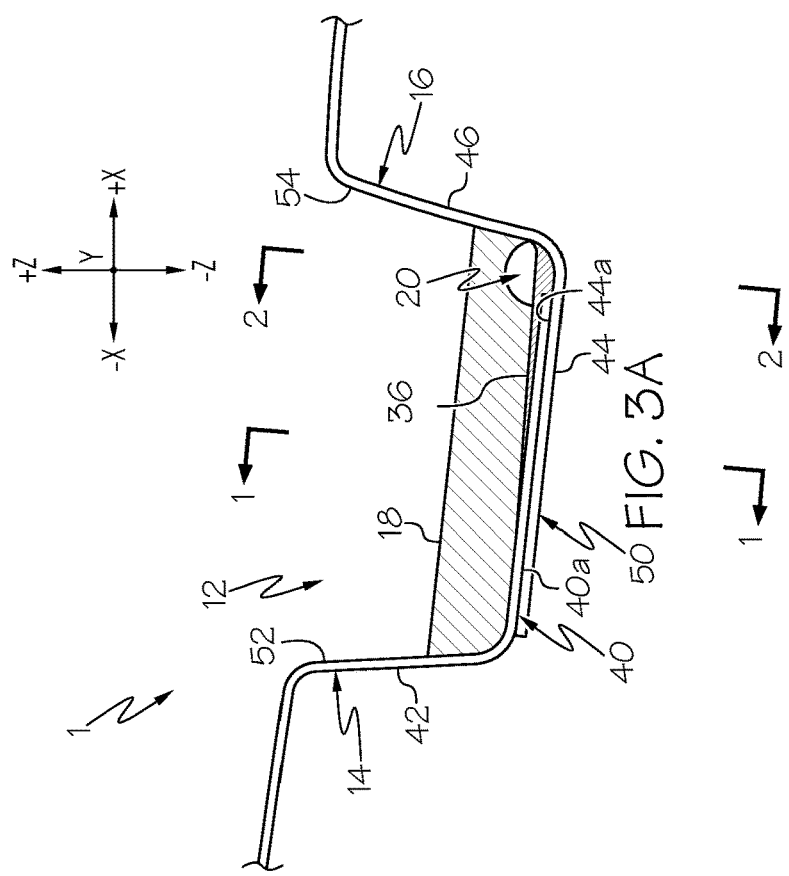

VEHICLE ROOF ASSEMBLIES HAVING FLUID PASSAGES

TECHNICAL FIELD

The present specification generally relates to vehicle roof assemblies including a roof ditch and, more specifically, vehicle roof assemblies including a drain in a roof ditch for draining stagnant water in the roof ditch.

BACKGROUND

Vehicle roof assemblies may include a roof panel welded to a side outer panel, where the roof panel and side outer panel define a roof ditch. A ditch sealer may be provided in the roof ditch to seal the weld between the roof panel and the side outer panel, thereby preventing corrosion due to water stagnation in the roof ditch. However, a portion of the ditch sealer is removed to mount a roof rack to the roof of the vehicle. The removal of the portion of the ditch sealer allows water to stagnate around the roof rack mount, thereby increasing the risk of corrosion.

Accordingly, a need exists for improved vehicle roof assemblies that drain water from the roof ditch.

SUMMARY

The present disclosure is directed to a vehicle roof assembly including a roof panel, a side panel coupled to the roof panel, thereby defining a roof ditch, a passage extending along the roof ditch, and a sealing member at least partially encasing the passage. The passage allows fluid to flow along the roof ditch.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3A schematically depicts a cross-sectional view of the vehicle roof ditch of FIG. 1 taken along section line 3-3 of FIG. 2, according to one or more embodiments shown and described herein; and FIG. 3B schematically depicts a cross-sectional view of another vehicle roof ditch taken along section line 3-3 of FIG. 2, according to one or more embodiments shown and described herein.

DETAILED DESCRIPTION

Figure 1:
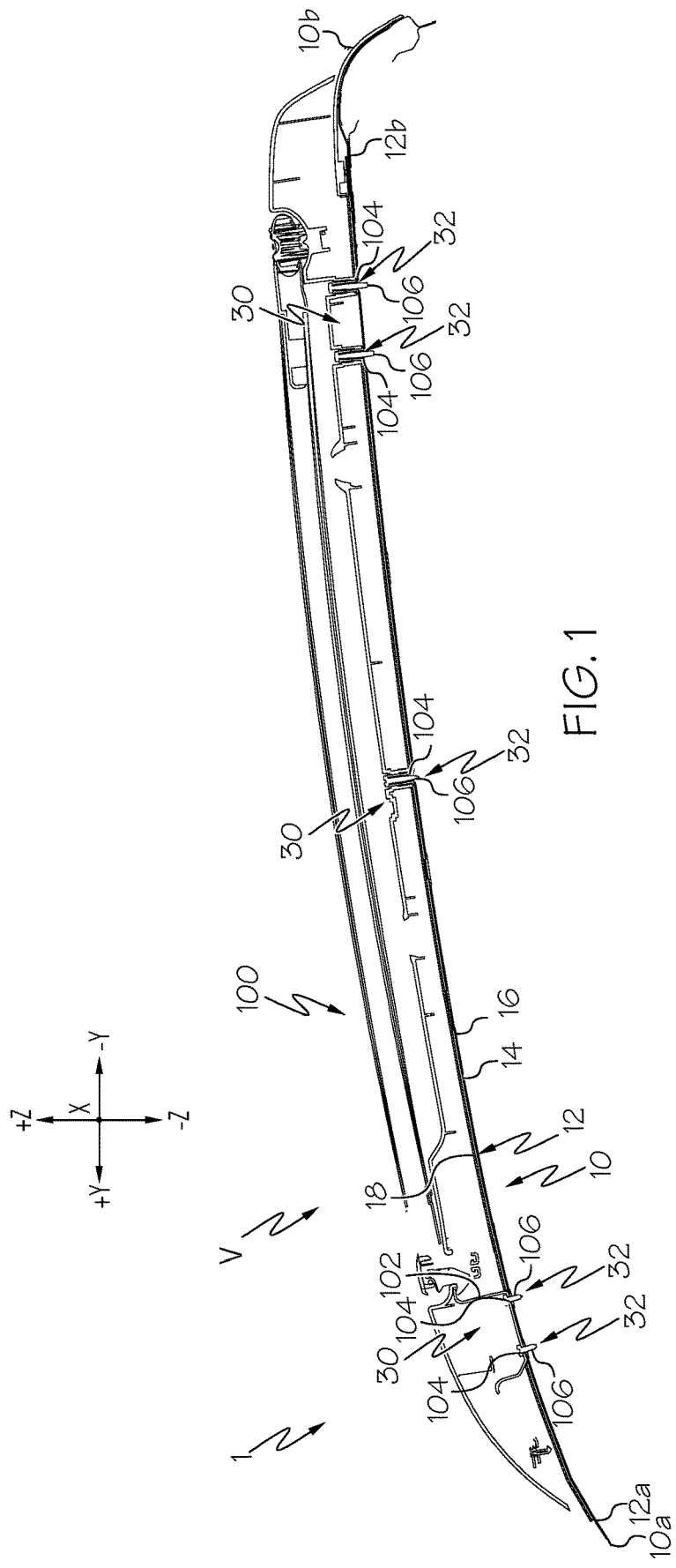
FIG. 1 schematically depicts a partial cross sectional side view of a vehicle roof assembly taken along section line 1-1 of FIG. 3A, including a vehicle roof ditch, according to one or more embodiments shown and described herein.

Embodiments described herein are directed to a vehicle roof assembly that includes a roof, a roof ditch extending in a vehicle front-rear direction, a sealing member positioned in and extending along the roof ditch, and a passage extending along the roof ditch. The sealing member may include openings formed throughout to allow an external vehicle component to be mounted to the roof. Fluids, such as water, may enter the roof ditch through the openings. The passage is positioned between the roof ditch and the sealing member, where the passage may direct a flow of the fluid collected in the roof ditch, to prevent the collected fluid from corroding the roof ditch.

As used herein, the term "vehicle longitudinal direction" refers to the forward-rearward direction of the vehicle (i.e., in the +/−Y direction). The term "vehicle lateral direction" refers to the cross-direction (i.e., in the +/−X direction), and is transverse to the vehicle longitudinal direction. The term "vehicle vertical direction" refers to the upward-downward direction of the vehicle (i.e., in the +/−Z direction). As used herein, "upper" or "top" is defined as the positive Z direction of the coordinate axis shown in the drawings. "Lower" or "bottom" is defined as the negative Z direction of the coordinate axis shown in the drawings.

Figure 2:
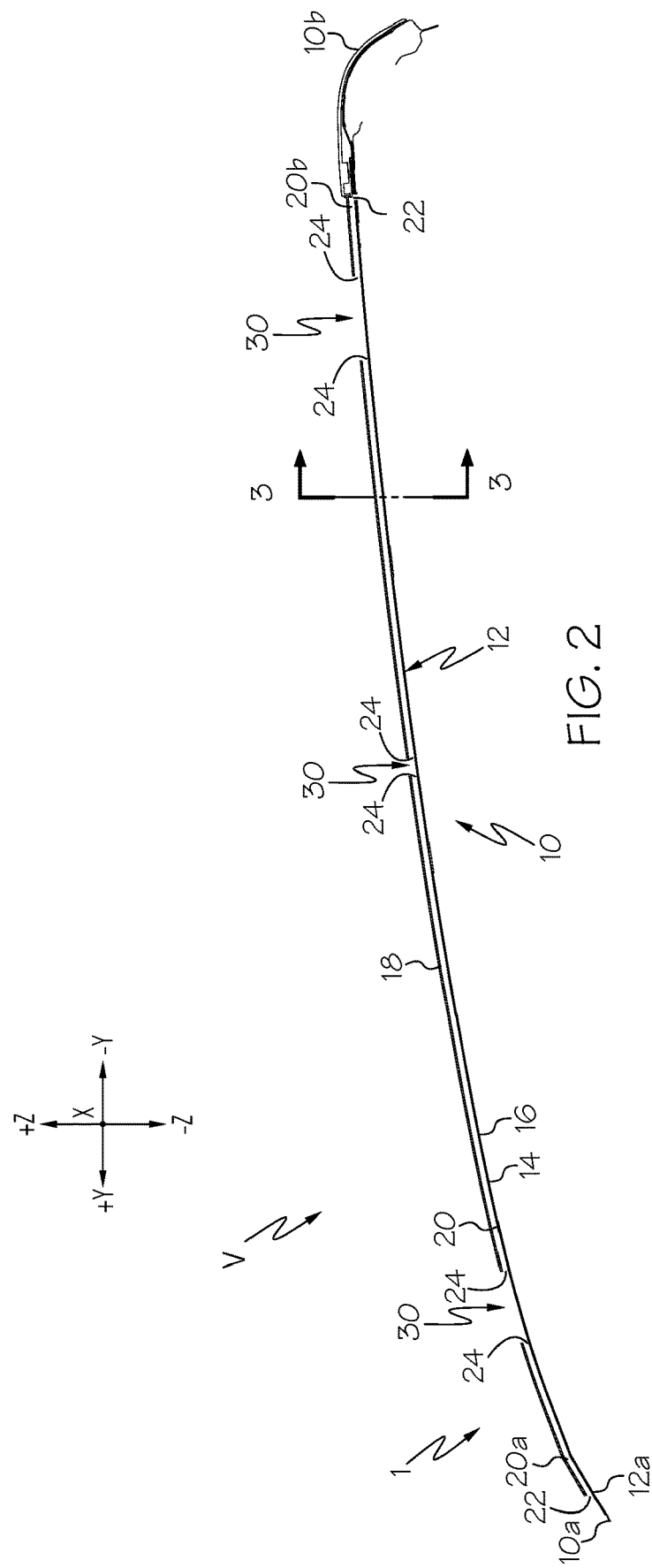
FIG. 2 schematically depicts a partial cross sectional side view of the vehicle roof assembly of FIG. 1, taken along section line 2-2 of FIG. 3A, according to one or more embodiments shown and described herein.

Referring now to FIG. 1, a partial cross-sectional view taken along section line 1-1 of a roof 10 of the vehicle V is shown. The section line 1-1 passes through a centerline of a vehicle roof assembly 1, and extends longitudinally (i.e., in the +/−Y direction) through fasteners 106. The vehicle roof assembly 1 for the vehicle V is illustrated according to one or more embodiments described herein. The vehicle roof assembly 1 may generally include a roof 10, a roof ditch 12 defined by a roof panel 14 and a side panel 16, a sealing member 18, and a passage 20 (FIG. 2). The roof 10 may be acutely angled in the vehicle longitudinal direction (i.e., in the +/−Y direction), where a front 10a of the roof 10 is lower in a vehicle vertical direction (i.e., in the +/−Z direction) than a rear 10b of the roof 10. The front 10a is forward of the rear 10b in the vehicle longitudinal direction (i.e., in the +/−Y direction). The roof ditch 12 extends along the roof 10 in the vehicle longitudinal direction, and includes a front end 12a positioned at the front 10a of the roof 10, and an opposite rear end 12b positioned at the rear 10b of the roof 10. The vehicle roof assembly 1 is provided on both sides of the roof 10 in the vehicle lateral direction (i.e., in the +/−X direction), where each side includes corresponding structure. As such, only one side of the vehicle roof assembly 1 is described.

The roof panel 14 at least partially forms a vehicle roof structure that extends between sides of the vehicle V in the vehicle lateral direction and between a front windshield and a rear windshield of the vehicle V in the vehicle longitudinal direction. The side panel 16 at least partially forms a vehicle side structure such as a vehicle door frame and/or side walls of the vehicle V. As described in greater detail below, the roof panel 14 is superposed with and coupled to the side panel 16, and the side panel 16 is positioned laterally outward in a vehicle width direction (i.e., in the +/−X direction) from the roof panel 14 with respect to a centerline of the vehicle extending in the vehicle longitudinal direction. The roof panel 14 may be coupled to the side panel 16 by welding, bolts, or the like. In embodiments, the side panel 16 may be superposed with the roof panel 14. In embodiments, the roof 10 may be formed of a monolithic piece, where the roof panel 14 and the side panel 16 are formed together.

Referring still to FIG. 1, the sealing member 18 extends along and overlays the roof ditch 12. The sealing member 18 seals the roof panel 14 and the side panel 16 within the roof ditch 12. The sealing member 18 may be formed of a material, such as rubber, thermoplastic, silicone, or the like. A plurality of seal openings 30 may be formed in the vehicle roof assembly 1 that extend through the sealing member 18 and the passage 20 (FIG. 2). In some embodiments, the sealing member 18 and passage 20 (FIG. 2) may be discontinuous along the vehicle longitudinal direction within the roof ditch 12. Mounting holes 32 may be formed in the roof ditch 12 that extend through the roof panel 14 and the side panel 16. The seal openings 30 and mounting holes 32 are configured to receive and mount an external vehicle component 100 to the roof 10. The external vehicle component 100 may be a roof rack, a vehicle antenna, or the like.

In embodiments where the external vehicle component 100 is a roof rack, an exemplary roof rack 100 may include a mounting portion 102, mounting openings 104 formed in and extending through the mounting portion 102, and fasteners 106. In some embodiments, the fasteners 106 may be bolts, screws, welds, rivets, or adhesive. The mounting portion 102 may extend into the seal opening 30, thereby contacting the roof ditch 12. The fasteners 106 may extend through the mounting openings 104 and the mounting holes 32, thereby coupling the roof rack 100 to the roof ditch 12.

Referring now to FIG. 2, a partial cross-sectional view taken along section line 2-2 of the roof 10 of the vehicle V is shown. The section line 2-2 is positioned laterally outward (i.e., in the +/−X direction) from section line 1-1, and extends longitudinally (i.e., in the +/−Y direction) through the passage 20. The passage 20 extends along the roof ditch 12, where the passage 20 is positioned between the roof ditch 12 and the sealing member 18. The passage 20 may be encased in the sealing member 18, where the sealing member 18 acts to seal the passage 20 within the roof ditch 12. The passage 20 is hollow, and allows fluid to flow along the roof ditch 12 below the sealing member 18. The passage 20 includes a passage front 20a and an opposite passage rear 20b, where the passage front 20a is positioned near the front end 12a of the roof ditch 12, and the passage rear 20b is positioned near the rear end 12b of the roof ditch 12.

The passage 20 further includes a plurality of drain openings 22 and mount openings 24 formed therein. The drain openings 22 may be positioned at the passage front 20a and the passage rear 20b that allow fluid to flow into and out of the passage 20. The mount openings 24 may be positioned adjacent to and in fluid communication with the seal openings 30, where the mount openings 24 allow fluid to flow into and out of the passage 20.

The passage 20 includes a first height, and the sealing member 18 includes a second height, where a ratio of the first height to the second height is about ½. However, in embodiments, the ratio of the first height to the second height may be any fraction less than 1, such as ⅒, ⅛, ⅕, ¼, ⅓, ⅔, ¾, ⅘, ⅞, 9/10, etc.

Referring now to FIG. 3A, a cross-sectional view of the roof assembly 1 taken along section line 3-3 is shown. As depicted in FIG. 3A, the passage 20 includes a semi-circular cross-sectional shape. However, the passage 20 may include any cross-sectional shape, such as circular, triangular, square, etc. The passage 20 may be at least partially formed in the sealing member 18. The passage 20 may be further defined by a paint sealer 36. In embodiments, the passage 20 may be formed entirely in the sealing member 18.

Referring now to FIG. 3B, a cross-sectional view of an alternative embodiment of the roof assembly 1 taken along section line 3-3 is shown. The roof assembly 1 may include a tubing 34 that defines the passage 20. The tubing 34 may be positioned between the sealing member 18 and the roof ditch 12, where the tubing 34 is encased and sealed by the sealing member 18. The tubing 34 may be formed of a material, including rubber, metal, plastic, PVC, or the like. As depicted in FIG. 2B, the tubing 34 and passage 20 include a circular cross-sectional shape. However, the tubing 34 and passage 20 may include any cross-sectional shape, such as circular, triangular, square, etc.

Referring collectively to FIGS. 3A and 3B, the roof assembly 1 may further include the paint sealer 36 that extends along the roof ditch 12. A crease or gap may be formed between the roof panel 14 and the side panel 16 due to the welding process. The paint sealer 36 seals the crease or gap, preventing water or other fluids from entering the crease or gap.

Referring still to FIGS. 3A and 3B, the roof panel 14 includes a roof lateral portion 40, and a roof vertical portion 42. The side panel 16 includes side lateral portion 44, and a side vertical portion 46. The roof lateral portion 40 includes a lower surface 40a, and the side lateral portion 44 includes an upper surface 44a. The roof lateral portion 40 is superposed with the side lateral portion 44, where the lower surface 40a contacts the upper surface 44a.

The roof ditch 12 includes a ditch bottom 50 defined by the roof lateral portion 40 and side lateral portion 44, a first side wall 52 defined by the roof vertical portion 42, and a second side wall 54 defined by the side vertical portion 46. The ditch bottom 50 may be acutely angled in the lateral direction (i.e., in the +/−X direction) such that the first side wall 52 is higher in the vertical direction (i.e., in the +Z direction) than the second side wall 54. The angle of the ditch bottom 50 biases stagnant water in the roof ditch 12 laterally outward (i.e., in the +/−X direction) toward the second side wall 54. The passage 20 may be located in the roof ditch 12 adjacent the second side wall 54, where the angle of the ditch bottom 50 biases stagnant water toward the passage 20, increasing the amount of water directed toward the passage 20.

In embodiments, the ditch bottom 50 may be acutely angled such that the second side wall 54 is higher than the first side wall 52. Further, the passage 20 may be positioned adjacent the first side wall 52. In embodiments, the ditch bottom 50 may be substantially parallel to the lateral direction (i.e., the +/−X direction).

Referring collectively to FIGS. 1-3B, operation of the roof assembly 1 will now be described. When the roof ditch 12 collects fluid, for example, when it is raining or during a car wash, fluid enters the roof ditch 12 through the seal opening 30 of the sealing member 18, where fluid collects and stagnates in the roof ditch 12, specifically at the roof panel 14. The acute angle of the roof ditch 12 guides stagnant fluid toward the drain openings 22 and the mount openings 24 of the passage 20. The mount openings 24 are in fluid communication with the seal openings 30 such that fluids that enter the roof ditch 12 through the seal openings 30 enter into the passage 20 through the mount openings 24. The stagnant fluid flows through the passage 20 toward the front 10a of the roof 10 when the vehicle is in a static state, and flows toward the rear 10b when the vehicle is in a dynamic state. In the static state, the vehicle is not moving. In the dynamic state, the vehicle is moving. Fluid may also collect in the roof ditch 12 above the sealing member 18, where the sealing member 18 guides the fluid toward the front 10a of the roof 10.

In the static state, the fluid is directed toward the passage front 20a of the passage 20 by the curvature of the roof assembly 1. The fluid flows out of the drain opening 22 at the passage front 20a, thereby exiting the roof ditch 12.

In the dynamic state, wind resistance on the vehicle increases the air pressure near the drain opening 22 of the passage 20 at the passage front 20a. Air moves into the passage 20 due to the increased air pressure, where the air moves the fluid in the passage 20 toward the passage rear 20b. The fluid flows out of the drain opening 22 at the passage rear 20b, thereby exiting the roof ditch 12.

It should now be understood that a vehicle roof assembly for preventing water buildup is disclosed. The vehicle roof assembly includes a roof, a roof ditch extending in a vehicle longitudinal direction, a sealing member positioned in and extending along the roof ditch, and a passage extending along the roof ditch, where the passage is sealed by the sealing member. The sealing member may include openings formed throughout to allow an external structure to be mounted to the roof, where water or other fluids may enter the roof ditch through the openings. The passage is positioned between the roof ditch and the sealing member, where the passage may direct a flow of the water or fluid collected in the roof ditch, to prevent the collected water or fluid from corroding the roof ditch.

It is noted that the term "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A vehicle roof assembly comprising:
   a roof panel;
   a side panel coupled to the roof panel, defining a roof ditch;
   a passage extending along the roof ditch;
   a sealing member at least partially encasing the passage, wherein the passage allows fluid to flow along the roof ditch; and
   an opening formed in the sealing member, wherein:
   the passage includes a front end and an opposite rear end, and a plurality of openings;
   the plurality of openings are positioned at the front end, the rear end, and adjacent the opening in the sealing member; and
   the passage extends from the front end to the opening in the sealing member, and from the opening in the sealing member to the rear end.

2. The vehicle roof assembly of claim 1, further comprising:
   a mount for mounting an external vehicle component, wherein the mount is positioned in the roof ditch.

3. The vehicle roof assembly of claim 1, wherein the sealing member is formed in the roof ditch.

4. The vehicle roof assembly of claim 1, wherein the passage is partially formed within the sealing member.

5. The vehicle roof assembly of claim 1, wherein the passage is entirely formed within the sealing member.

6. The vehicle roof assembly of claim 1, further comprising:
   a tubing extending along the roof ditch and encased by the sealing member, wherein the passage is defined by the tubing.

7. The vehicle roof assembly of claim 1, wherein the roof panel is superposed with the side panel.

8. The vehicle roof assembly of claim 1, wherein the roof ditch includes a bottom, a first side wall, and a second side wall.

9. The vehicle roof assembly of claim 8, wherein the passage is positioned adjacent one of the first side wall and second side wall.

10. The vehicle roof assembly of claim 8, wherein the roof ditch is acutely angled in a vehicle width direction, such that the first side wall is positioned higher than the second side wall in a vehicle vertical direction, and
    the passage is positioned adjacent the second side wall.

11. The vehicle roof assembly of claim 1, wherein a cross-section of the passage is circular.

12. The vehicle roof assembly of claim 1, wherein a cross-section of the passage is semi-circular.

13. A vehicle roof assembly comprising:
    a roof panel;
    a side panel coupled to the roof panel, defining a roof ditch;
    a passage extending along the roof ditch;
    a sealing member at least partially encasing the passage, wherein the passage allows fluid to flow along the roof ditch; and
    a tubing extending along the roof ditch and encased by the sealing member, wherein the passage is defined by the tubing.

14. The vehicle roof assembly of claim 13, wherein the sealing member is formed in the roof ditch.

15. The vehicle roof assembly of claim 13, wherein the roof panel is superposed with the side panel.

16. The vehicle roof assembly of claim 13, wherein the roof ditch includes a bottom, a first side wall, and a second side wall.

17. The vehicle roof assembly of claim 16, wherein the passage is positioned adjacent one of the first side wall and second side wall.

18. The vehicle roof assembly of claim 16, wherein the roof ditch is acutely angled in a vehicle width direction, such that the first side wall is positioned higher than the second side wall in a vehicle vertical direction, and
    the passage is positioned adjacent the second side wall.

19. The vehicle roof assembly of claim 13, wherein a cross-section of the passage is circular.

* * * * *